US012619489B2

(12) United States Patent
Itsuji et al.

(10) Patent No.: US 12,619,489 B2
(45) Date of Patent: May 5, 2026

(54) DETECTING ANOMALIES IN EMBEDDED ARTIFICIAL INTELLIGENCE SYSTEMS

(71) Applicant: Hitachi, Ltd., Tokyo (JP)

(72) Inventors: Hiroaki Itsuji, Novi, MI (US); Subrata Kumar Kundu, Canton, MI (US)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 18/429,582

(22) Filed: Feb. 1, 2024

(65) Prior Publication Data

US 2025/0252006 A1 Aug. 7, 2025

(51) Int. Cl.
| | |
|---|---|
| *G06F 11/00* | (2006.01) |
| *G06F 11/07* | (2006.01) |
| *G06N 20/00* | (2019.01) |

(52) U.S. Cl.
CPC ........ *G06F 11/079* (2013.01); *G06F 11/0739* (2013.01); *G06N 20/00* (2019.01)

(58) Field of Classification Search
CPC .... G06F 11/079; G06F 11/0739; G06N 20/00
See application file for complete search history.

(56) References Cited

U.S. PATENT DOCUMENTS

| | | | | |
|---|---|---|---|---|
| 7,287,195 | B1 * | 10/2007 | Folkesson | G06F 11/0748 701/33.4 |
| 10,062,219 | B2 * | 8/2018 | Richter | G07C 5/008 |
| 11,367,218 | B2 | 6/2022 | Itsuji et al. | |
| 11,639,184 | B2 * | 5/2023 | Kumar | B60W 60/0025 701/23 |

| | | | | |
|---|---|---|---|---|
| 11,708,088 | B2 * | 7/2023 | Liu | G01C 21/38 701/26 |
| 11,731,612 | B2 * | 8/2023 | Zhou | G05D 1/0221 701/23 |
| 2020/0342099 | A1 * | 10/2020 | Kerstein | H04L 63/1425 |
| 2021/0146939 | A1 * | 5/2021 | Sari | G01S 13/931 |
| 2021/0190638 | A1 * | 6/2021 | Augustyniak | G07C 5/0816 |
| 2022/0035733 | A1 * | 2/2022 | Zhu | G06F 11/3696 |
| 2022/0155184 | A1 * | 5/2022 | Ravi | F04B 51/00 |

(Continued)

FOREIGN PATENT DOCUMENTS

JP 2021128457 A 9/2021

OTHER PUBLICATIONS

Akhilan Boopathy, et al., "CNN-Cert: An Efficient Framework for Certifying Robustness of Convolutional Neural Networks", MIT-IBM Watson AI Lab, IBM Research, Nov. 29, 2018.

(Continued)

*Primary Examiner* — Jonathan D Gibson
(74) *Attorney, Agent, or Firm* — MATTINGLY & MALUR, PC

(57) ABSTRACT

In some examples, a system receives, from a mobile apparatus, at least mobile apparatus location data and artificial intelligence (AI) output data. The system determines a location corresponding to the mobile apparatus location data, and accesses, based at least on the location, past AI output data stored in a data structure and associated with the location. The system compares the received AI output data with the past AI output data stored in the data structure for the location. Based at least on comparing the received AI output data with the past AI output data associated with the location, the system sends an instruction to the mobile apparatus to cause the mobile apparatus to perform at least one action.

20 Claims, 7 Drawing Sheets

100 —

(56) References Cited

U.S. PATENT DOCUMENTS

| | | | | |
|---|---|---|---|---|
| 2022/0382611 A1* | 12/2022 | Kapish | ............... | G06F 11/0709 |
| 2023/0122334 A1* | 4/2023 | Kadry | ............... | B60R 16/0232 |
| | | | | 701/29.2 |
| 2023/0159052 A1* | 5/2023 | Yang | ............... | G08G 1/096775 |
| | | | | 701/23 |
| 2024/0253644 A1* | 8/2024 | Itsuji | .................... | B60W 50/14 |
| 2024/0326867 A1* | 10/2024 | Hariharan | ......... | B60W 60/0015 |
| 2025/0252006 A1* | 8/2025 | Itsuji | .................. | G06F 11/0739 |

OTHER PUBLICATIONS

Chih-Hong Cheng, et al., "Runtime Monitoring Neuron Activation Patterns", Research Institute of the Free State of Bavaria, Sep. 19, 2018, Email: {cheng, nuehrenberg}@fortiss.org, hirotoshi_yasuoka@denso.co.jp.

* cited by examiner

400

DETECTING ANOMALIES IN EMBEDDED ARTIFICIAL INTELLIGENCE SYSTEMS

BACKGROUND

Semi-autonomous vehicle systems or otherwise advanced driver assistance systems (ADAS), and self-driving systems or otherwise autonomous driving (AD) systems are systems that automate or otherwise enhance vehicle control for improved safety, automated navigation, and the like. Such systems may employ embedded onboard computing devices referred to as "electronic control units" (ECUs), which may include AD/ADAS ECUs, powertrain ECUs, chassis ECUs, and so forth. For example, an AD/ADAS ECU may be configured to execute domain specific functionalities, e.g., perception, localization, navigation, vehicle control, and the like. To perform these functions, artificial intelligence (AI) algorithms (e.g., machine learning models) may be implemented on AD/ADAS ECUs or other vehicle ECUs.

AI algorithms may include deep neural networks (DNNs) and/or various other types of artificial neural networks and/or various other types of machine learning models. For example, AI algorithms may be used in the ECUs of AD/ADAS vehicles for realizing a highly accurate and safe automated driving experience. For instance, an AI application may be used in various roles, such as in object detection and mission-critical controls, e.g., for performing emergency braking, lane changes, evasive maneuvering, and the like. A malfunction in an AI algorithm upon which a vehicle depends may lead to severe accidents. Accordingly, while the use of AI algorithms for enabling AD/ADAS in vehicles is expected to be beneficial, ensuring that these systems are operating correctly and as intended can improve vehicle safety.

SUMMARY

In some implementations, a system receives, from a mobile apparatus, at least mobile apparatus location data and artificial intelligence (AI) output data. The system determines a location corresponding to the mobile apparatus location data, and accesses, based at least on the location, past AI output data stored in a data structure and associated with the location. The system compares the received AI output data with the past AI output data stored in the data structure for the location. Based at least on comparing the received AI output data with the past AI output data associated with the location, the system sends an instruction to the mobile apparatus to cause the mobile apparatus to perform at least one action.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DESCRIPTION

Figure 1:
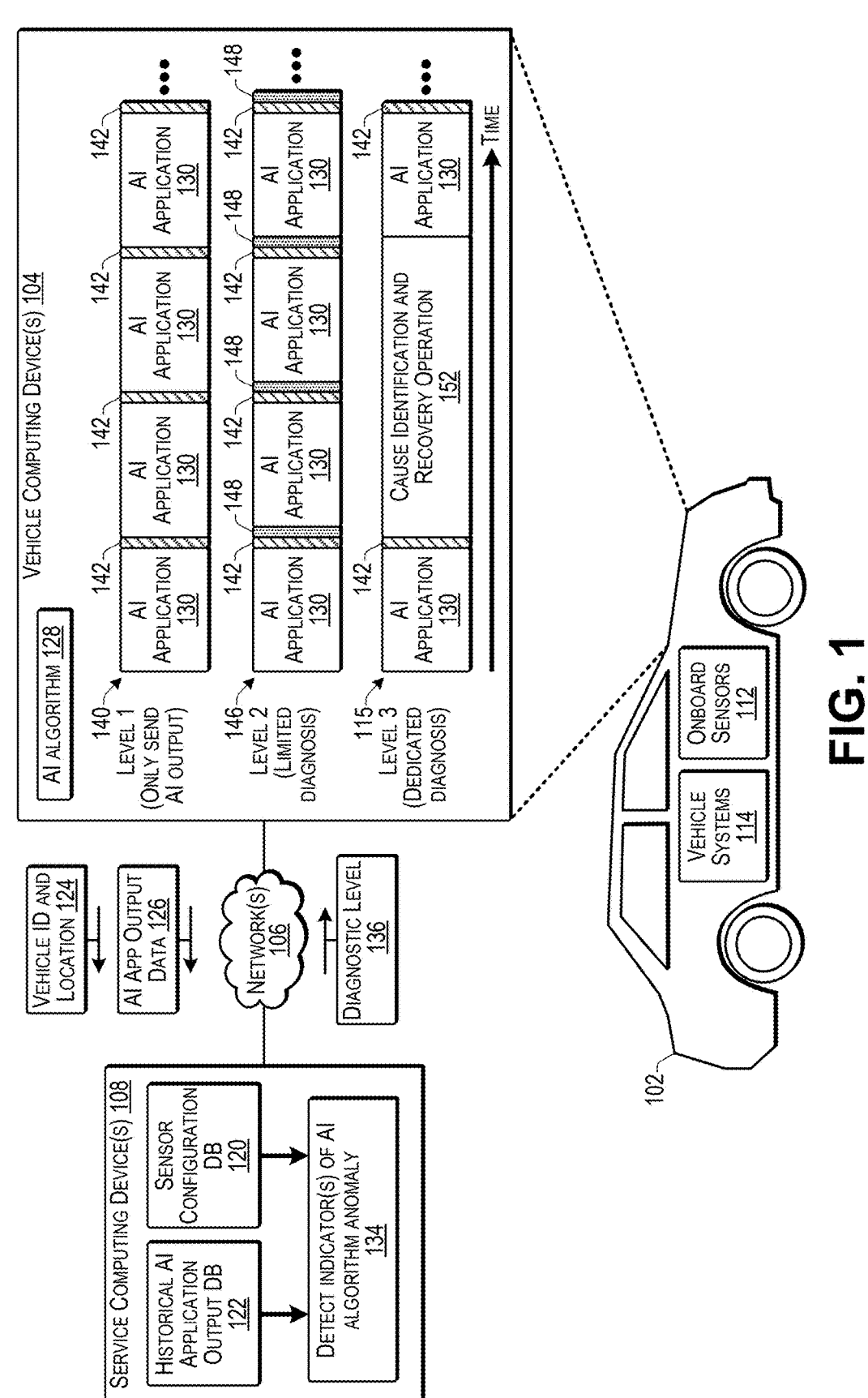
FIG. 1 illustrates a logical configuration of an example system for performing efficient monitoring of AI algorithms according to some implementations.

Some implementations herein are directed to techniques and arrangements for detecting anomalies that may occur in AI algorithms, such as may be used by AI applications that are executed for ADAS and/or AD systems employed in vehicles and/or in computing devices of other types of mobile apparatuses that may employ AI algorithms, such as aerial drones or other types of aerial vehicles, marine drones and other types of marine vehicles, submarine drones and other types of submarine vehicles, mobile autonomous robots and semiautonomous robots, and so forth. For instance, AI applications may include applications that execute an AI algorithm for generating an output or result. The examples herein are able to detect indicators of AI algorithm anomalies for various AI-embedded systems. The examples herein include detecting indicators of AI algorithm anomalies on the cloud side based on current and/or past AI application outputs, and further based on the vehicle's onboard sensor configuration information. Examples of AI application outputs may include detected object identifiers, detected object locations, corresponding confidence scores, and the like. For example, when a current AI application output is inconsistent with the historical AI application output at the same location, and the confidence level of the current AI application output is high, this inconsistency may be an indication of the presence of an AI algorithm anomaly. As one example, an AI application output may be judged to indicate an AI algorithm anomaly when the AI application recognizes a person in a highway with a high confidence level even though the historical probability of a person being observed in the highway at that location is extremely low.

In some implementations, historical data of AI application outputs are stored in a database or other type of data structure for each road segment that a vehicle traverses. Predictive judgments of AI application outputs may be performed for each road segment that the vehicle sensors are able to cover at the current vehicle location, which may include taking into consideration the respective sensor configuration information of the current vehicle and of the past vehicles. As a result, the number of diagnostic processes performed on the vehicle side can be reduced by changing the diagnosis level (e.g., corresponding to a frequency of diagnosis) dynamically according to the judgment results of the indicators of AI algorithm anomalies.

Additionally, or alternatively, such as in the examples herein that are directed to other types of mobile apparatuses, rather than storing the historical AI application output in association with a road segment, the AI application outputs may be stored in association with corresponding location information, such as longitude and latitude coordinates (and altitude/depth in some cases). A clustering technique or other threshold may be applied to group together AI application outputs that are within a threshold distance of each other. Subsequently, when retrieving historical AI application outputs from the database or other data structure, a similar threshold may be applied to location data received from the mobile apparatus to determine the historical AI application outputs that are sufficiently close to the received location of the mobile apparatus to be relevant to the AI algorithm output of the mobile apparatus.

Conventional techniques for AI algorithm implementation are typically unable to detect indicators of AI algorithm anomalies. On the other hand, examples herein are able to efficiently detect (i.e., with low computational overhead) indicators of various AI algorithm anomalies that may be caused, for example, by hardware issues, software issues, and/or security issues. For example, hardware issues may include bad memory locations (permanent faults), faulty sensors, faulty network connections, hardware intrusion, and the like. Further, software issues may occur such as due to immature training of an AI algorithm, bugs in programming code, or due to security issues such as due to malicious attacks, any of which may cause unexpected AI behavior. Accordingly, the examples herein are intended to ensure that AI algorithms behave normally during their operation.

In the design and testing phase of an AI algorithm, the correct operation of an AI algorithm is typically verified using a large amount of data as an AI algorithm verification data set. However, the size of the AI verification datasets are too large to be implemented on the vehicle computing device(s) 104. Further, the available computational capacity of the vehicle computing device(s) 104 is usually limited, and verification of an AI algorithm with such limited computational resources could not be achieved in a practical amount of time. Consequently, the examples herein are configured to verify the AI algorithm with efficient usage of the computational resources of the vehicle computing device(s) 104. As a result, the number of compute-intensive diagnostic functions for detecting AI anomalies is substantially reduced by the implementations herein, while improving the reliability of the embedded AI systems, such as for AD/ADAS ECUs or other vehicle computing devices 104.

The examples herein include an AI diagnostic method for diagnosing anomalies in AI algorithms implemented on AD/ADAS ECUs or other vehicle computing devices. For example, a vehicle herein may include one or more machine learning models (MLMs) such as artificial neural networks or other types of AI algorithms for performing various functions. In some cases, the AI algorithm(s) may be included in or otherwise employed by an AI application executed on an AD/ADAS ECU or other vehicle computing device onboard the vehicle.

Further, some implementations herein may include an AI diagnostic technology that can efficiently improve the reliability of in-vehicle AI algorithms and corresponding AI applications. Thus, the AI diagnostics techniques herein may be executed for efficiently detecting an improperly operating AI algorithm, such as may occur due to hardware failures, other hardware anomalies, security breaches, software errors, and the like, as discussed above.

For instance, due to a hardware failure, an AI algorithm may begin to behave differently over time as compared to how the AI algorithm performed immediately after training and deployment. There are various factors such as permanent faults in hardware and/or hardware intrusion that could affect the output of the AI algorithm and possibly cause critical accidents. Accordingly, implementations here are able to determine whether an AI algorithm behavior has changed and/or whether the AI algorithm is operating normally.

The AI diagnostic techniques herein do not require hardware redundancy (e.g., the addition of other AI-executing hardware) and do not depend on any specific hardware. The AI diagnostic techniques described herein are cost effective while also improving vehicle safety by efficiently examining the operation of an AI algorithm. As one example, when a hardware anomaly occurs in an ECU system, such as may include an AD/ADAS ECU, a powertrain ECU, a chassis ECU, and so forth, the examples herein may efficiently identify the cause of the anomaly, such as which hardware elements are related to the AI algorithm that is not operating correctly. Consequently, the examples herein also improve the maintainability and repair efficiency of an ECU system.

For discussion purposes, some example implementations are described in the environment of an AD/ADAS ECU that executes one or more AI algorithms onboard a vehicle. However, implementations herein are not limited to the particular examples provided, and may be extended to other types of computing devices, other types of vehicles, other types of AI algorithms, other types of hardware configurations, other types of local conditions, and so forth, as will be apparent to those of skill in the art in light of the disclosure herein. For example, the solution herein is scalable, and may be applied to ubiquitous systems in addition to ground vehicles, such as construction, farming, and mining equipment, ships and other marine vehicles, and so forth. Implementations herein may also be scaled to smaller applications, such as autonomous robots and the like.

FIG. 1 illustrates a logical configuration of an example system 100 for performing efficient monitoring of AI algorithms according to some implementations. The system 100 includes a vehicle 102, which is an example of a ground vehicle mobile apparatus to which the techniques described herein may apply. As mentioned above, in other examples, the techniques and arrangements herein also apply to other types of mobile apparatuses that may employ AI algorithms, such as aerial drones or other types of aerial vehicles, marine drones and other types of marine vehicles, submarine drones and other types of submarine vehicles, mobile autonomous robots and semiautonomous robots, and so forth. Consequently, the description herein applies fully to these and other types of mobile apparatuses that employ AI algorithms.

In the illustrated example, the vehicle 102 includes one or more vehicle computing devices 104 able to communicate over one or more networks 106 with one or more service computing devices 108. The vehicle 102 may further include one or more onboard sensors 112 and one or more vehicle systems 114 that are in communication with the vehicle computing device(s) 104, such as via a CAN bus (controller area network bus) (not shown in FIG. 1) or the like.

The one or more networks 106 may include any appropriate network, including a wireless network, such as a cellular network; a wide area network, such as the Internet; a local area network, such an intranet; a local wireless network, such as Wi-Fi; close-range wireless communications, such as BLUETOOTH®; a wired network, including fiber optics and Ethernet; any combination thereof, or any other suitable communication network. Components used for such communication technologies can depend at least in part upon the type of network, the environment selected, or both. Protocols for communicating over such networks are well known and will not be discussed herein in detail.

In this example, a server AI diagnosis program (not shown in FIG. 1) executing on the service computing device(s) 108 may maintain or otherwise access a sensor configuration database 120 that may include information about the respective sensor configurations of individual vehicles 102 that may access a service provided by the service computing device(s) 108 for detecting indicators of AI algorithm anomalies. The service computing device(s) 108 may further maintain or otherwise access a historical AI application output database 122 that may include the outputs of a large number of AI applications of a large number of other vehicles 102 in the past at specific locations, such as may be associated with road segments, or other location information. For instance, the locations may be determined based on satellite positioning system information received from a satellite receiver onboard the respective vehicles, or other location sensing techniques, and may include specific geographic coordinates (e.g., longitude and latitude) corresponding to recognition of previously identified landmarks, geographic features, traffic signs/signals/intersections, other vehicles, pedestrians, or any of numerous other recognized objects, road features and conditions, or the like.

In some cases, road segments may be determined for some or all of the roads in a region. Numerous techniques for defining road segments based on mapping information are known in the art. As one non-limiting example, the service computing device(s) 108 may acquire mapping information, such as from a map-providing service server or the like (not shown in FIG. 1), and may identify routes along the roads indicated in the mapping information. The service computing device(s) 108 may divide each identified route into a plurality of waypoints. As one example, the waypoints may be identified on a high definition map or a standard map that may correspond to particular longitude and latitude coordinates. Next, the service computing device(s) 108 may identify respective road segments between each respective sequential pair of waypoints. The length of each road segment between each pair of waypoints may vary from a few centimeters to several hundred meters, depending in part on the configuration of the road and the desired level of granularity. Based at least on the waypoint information, each road segment may be associated with geolocation information. Furthermore, while one technique for defining road segments has been described herein, numerous variations will be apparent to those of skill in the art having the benefit of the disclosure herein.

In addition, while road segments are described in the examples herein as one technique for associating AI output data with geolocation coordinates, in other examples, road segments might not be used. Instead, such as in the examples herein that are directed to other types of mobile apparatuses, the actual geolocation coordinates may be associated with each set of AI output data, and various techniques, such as clustering techniques or the like, may be used for associating particular AI output data with particular vehicle geolocation coordinates. For instance, a clustering technique or other thresholding method may be applied to group together AI application outputs that are within a threshold distance of each other. Subsequently, when retrieving historical AI application outputs from the AI application output database 122, the same threshold or a different threshold may be applied to location data received from the mobile apparatus to determine the historical AI application outputs that are sufficiently close to the received location of the mobile apparatus to be relevant to the AI algorithm output of the mobile apparatus.

In the illustrated example a vehicle AI diagnostic program (not shown in FIG. 1) may send a vehicle identifier (ID) for the particular vehicle 102 and a current location of the vehicle 102 to the service computing device(s) 108, as indicated at 124. The service computing device(s) 108 may use the vehicle ID to determine the sensor configuration of the vehicle 102 by accessing the sensor configuration database 120. If the vehicle sensor configuration is not already included in the sensor configuration database 120, the service computing devices 108 may request the sensor configuration from the vehicle computing device 104. In addition, the vehicle computing device 104 may send AI application output data 126 to the service computing device(s) 108 to enable the service computing devices 108 to detect whether there may be an anomaly in an AI algorithm 128 employed by an AI application 130 that is running on the vehicle computing device(s) 104.

As one example, an AI algorithm 128 such as a convolutional neural network, deep learning neural network, or other type of machine learning model may be employed for object detection and recognition by the AI application 130 (or for performing any of various other AI functions) onboard the vehicle 102. As indicated at 134, the service computing device(s) 108 may receive the AI application output data 126 from the vehicle computing device 104 for detecting, on the cloud side, indicators of an AI anomaly by comparison of the AI application output data 126 with the historical AI application outputs in the database 122 for the same approximate vehicle location and same or similar sensor configuration. Based on the analytical results of whether any indicators of an AI anomaly are detected on the cloud side, the service computing device(s) 108 may send a diagnostic level 136 to the vehicle computing device 104.

The diagnostic level 136 sent to the vehicle computing device 104 may instruct the vehicle computing device 104 as to what diagnostic level to apply to the particular AI application 130 based on the current analysis of the AI algorithm for detecting anomalies. The diagnostic level may be changed dynamically on the vehicle computing device 104 as appropriate, which helps to reduce the computational load on the vehicle computing device 104. For instance, as discussed additionally below, the vehicle computing device 104 may execute the vehicle AI diagnostic program according to different diagnosis levels.

At the service computing device(s) 108, the data used for detecting indicators of an AI anomaly may include the historical AI application outputs determined from the historical AI application output database 122 database information, the sensor configuration of the vehicle 102 determined from the sensor configuration database 120, the vehicle location, such as may be determined from a vehicle GPS receiver (not shown in FIG. 1) or the like, the vehicle ID, and the current AI application output data 126 that has been output by the AI application 130 executing on the vehicle computing device 104.

In some examples, the historical AI application output DB 122 may store information on objects recognized by AI applications for each road segment of a plurality of previously identified road segments corresponding to mapping information for a region in which the vehicle 102 is operating. As one concrete example, suppose that the historical AI application output DB 122 indicates that 1050 traffic lights were recognized in 850 camera images, respectively, for a selected road segment n. This information may represent a historical probability of an object's occurrence, e.g., indicating that is likely that the AI application 130 should recognize a traffic light when the location of the vehicle 102 corresponds to the road segment n. Additionally, or alternatively, as mentioned above, in other examples, location information (e.g., longitude, latitude, altitude, depth, etc.) and clustering may be used instead of, or in addition to, road segments.

The sensor configuration DB 120 may include information on the configurations and specifications of the onboard sensors that are included onboard the vehicle 102. Further the sensor configuration information may include the orientation and range used by the sensors to identify the covered road segments (e.g., road segments n, n+1, n+2). The vehicle location information may include information on the current longitude and latitude of the vehicle that is used to identify covered road segments and to determine corresponding global coordinates of any detected objects. As mentioned above, the vehicle location information may be determined by satellite positioning system information, such as by an output of a vehicle GPS (global positioning system) receiver. Additionally, or alternatively, other types of location sensors may be used to determine or verify the vehicle's geographic location, such as WiFi signals, cellular tower signals, traffic cameras, communications from other vehicles, and the like. The vehicle ID may be an individually distinguishable value that identifies the particular vehicle 102 (e.g., unique within the system 100) and may be used by the service computing devices 108 for accessing the corresponding sensor configuration information for the particular vehicle 102 (or at least the vehicle brand and model) from the sensor configuration DB 120.

In some examples, the current AI output data 126 may include information on detected object names (e.g., at least the type of object recognized), confidence scores, and object locations) that are compared with the historical AI application outputs from the historical AI application output database 122. Based on the comparison and the other above-discussed information, the service computing device 108 determines whether there are any indicators of AI algorithm anomalies. For example, when the AI algorithm recognizes, with a high confidence score, a person on a highway where the probability of a person being observed is very low, it is judged as an indicator of AI anomaly.

Depending on the analytical results for detecting one or more indicators of an AI anomaly by the service computing device(s) 108, the level of diagnostics may be changed dynamically on the vehicle side, which can help to reduce the computational load caused by execution of diagnostic operations by the vehicle computing devices 104. For example, as indicated at 140, for performing diagnosis level 1, the AI application output data 126 may be periodically sent from the vehicle computing device(s) 104 to the service computing device(s) 108, such as at the periods 142, and no other actual diagnosis of the AI algorithm 128 is performed by the vehicle computing device(s) 104 when level 1 is in effect and the execution of the AI application 130 is not affected.

If the service computing device(s) 108 detects minor indicators of an AI algorithm anomaly based at least in part on the received AI application output data 126, the service computing device(s) 108 may instruct the vehicle computing device(s) 104 to increase the applied diagnosis level to diagnosis level 2. As indicated at 146, when diagnosis level 2 is in effect, periodic AI diagnosis is performed by the vehicle computing device(s) 104 on the AI algorithm 128, as indicated at 148, and the AI application output data 126 is also still sent periodically to the service computing device(s) 108. In some examples, the frequency of the diagnosis is determined at least in part by the availability of computational resources of the vehicle computing device(s) 104.

In addition, if the service computing device(s) 108 detects significant indicators of an AI algorithm anomaly from the AI application output data 126, the service computing device(s) 108 may instruct the vehicle computing device(s) 104 to change the diagnosis level to level 3. As indicated at 150, when the diagnosis level is set to level 3, then a dedicated diagnosis (referred to herein as a cause identification and recovery operation 152) may be performed. As one example, the cause identification and recovery operation 152 may include rebooting the relevant vehicle computing device 104, as well as performing other diagnostic procedures, such as checking for viruses and malware, permanent memory faults, and the like. In some examples, the vehicle may be pulled over the side of the road to perform the cause identification and recovery operation 152, may navigate to a maintenance facility, or the like. When the cause identification and recovery operation 152 is completed, the vehicle computing device(s) 104 may again execute the AI application 130, and may periodically send the AI application output data 126 to the service computing device(s) 108 to check whether the AI algorithm anomaly has been resolved. If the anomaly is not resolved after several iterations, then, depending on the severity of the anomaly, the vehicle may pull over, continue at a slower pace, drive to a maintenance facility, or the like.

In addition to the results of detecting indicators of AI anomaly (normal or minor anomaly indicators or significant anomaly indicators), the diagnostic level may also be changed based on other considerations. As one example, the vehicle control information may indicate unexpected behavior, such as sudden braking, sudden acceleration, unnecessary lane changes, and so forth. As another example, if the total amount of time being used by the vehicle computing device(s) 104 for performing the periodic diagnosis 148 exceeds a threshold time, this may also be an indicator that the level should be increased to level 3.

Figure 2:
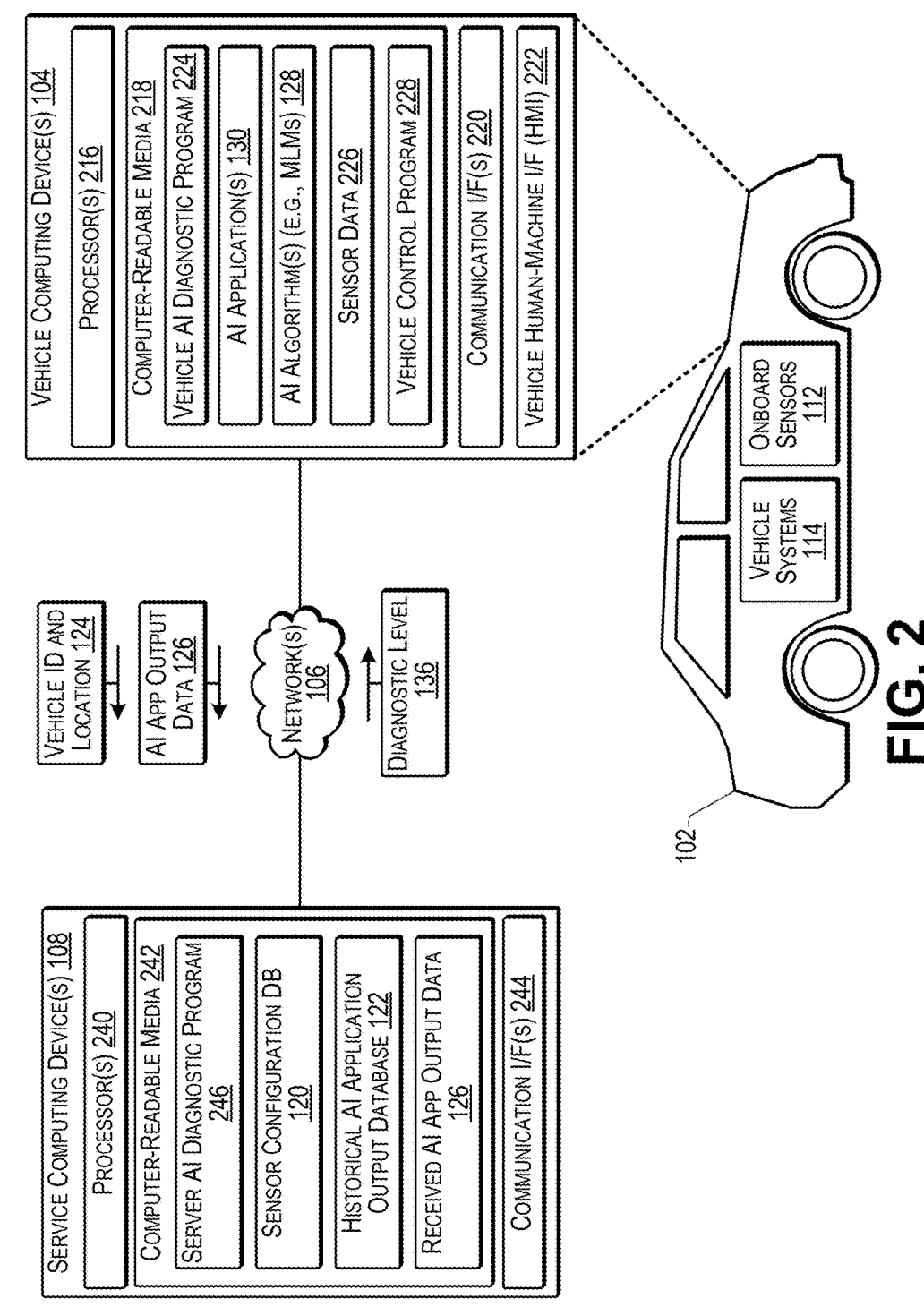
FIG. 2 illustrates an example hardware configuration of the system of FIG. 1 according to some implementations.

FIG. 2 illustrates an example hardware configuration of the system 100 of FIG. 1 according to some implementations. For instance, each vehicle computing device 104 may include one or more processors 216, one or more computer-readable media 218, one or more communication interfaces (I/Fs) 220, and, in some examples, one or more vehicle human-machine interfaces (HMIs) 222. In some cases, the vehicle computing device(s) 104 may include one or more ECUs (electronic control units) or any of various other types of computing devices. For instance, the vehicle computing device(s) 104 may include one or more ADAS/AD ECUs for controlling at least some of the vehicle systems 114, such as to perform ADAS and/or AD tasks, such as navigation, braking, steering, acceleration, deceleration, and so forth. The vehicle computing device(s) 104 may also include one or more other ECUs, such as for controlling other systems of the vehicle systems 114, and all of which together may be included in the vehicle computing device(s) 104 described herein.

"ECU" is a generic term for any embedded processing system that controls one or more of the systems, subsystems, or components in a vehicle. Software, such as a vehicle AI diagnostic program 224, a vehicle control program 228 and/or the AI application(s) 130, may be executed by one or more ECUs and may be stored in a portion of the computer-readable media 218 (e.g., program ROM, solid state storage, etc., as discussed below) that is associated with the respective ECU to enable the ECU to operate as an embedded system. ECUs may typically communicate with each other over a vehicle bus, such as the CAN bus mentioned above, according to a vehicle bus protocol.

Each ECU or other vehicle computing device 104 may include one or more of the processors 216, which may include one or more of central processing units (CPUs), graphics processing units (GPUs), microprocessors, micro-computers, microcontrollers, digital signal processors, state machines, logic circuits, system-on-chip processors, and/or any devices that manipulate signals based on operational instructions. As one example, the processor(s) 216 may include one or more hardware processors and/or logic cir-cuits of any suitable type specifically programmed or con-figured to execute the algorithms and other processes described herein. The processor(s) 216 may be configured to fetch and execute computer-readable instructions stored in the computer-readable media 218, which may program the processor(s) 216 to perform the functions described herein.

The computer-readable media 218 may include volatile and nonvolatile memory and/or removable and non-remov-able media implemented in any type of technology for storage of information, such as computer-readable instruc-tions, data structures, programs, program modules, and other code or data. For example, the computer-readable media 218 may include, but is not limited to, RAM, ROM, EEPROM, flash memory or other memory technology, optical storage, solid state storage, magnetic disk(s), cloud storage, or any other medium that can be used to store the desired infor-mation and that can be accessed by a computing device. Depending on the configuration of the vehicle computing device(s) 104, the computer-readable media 218 may be a tangible non-transitory medium to the extent that, when mentioned, non-transitory computer-readable media exclude media such as energy, carrier signals, electromagnetic waves, and/or signals per se. In some cases, the computer-readable media 218 may be at the same location as the vehicle computing device 104, while in other examples, a portion of the computer-readable media 218 may be remote from the vehicle computing device 104.

The computer-readable media 218 may be used to store any number of functional components that are executable by the processor(s) 216. In many implementations, these func-tional components comprise instructions or programs that are executable by the processor(s) 216 and that, when executed, specifically program the processor(s) 216 to per-form the actions attributed herein to the vehicle computing device 104. Functional components stored in the computer-readable media 218 may include the vehicle AI diagnostic program 224, the vehicle control program 228, and one or more of the AI applications 130, each of which may include one or more computer programs, applications, executable code, or portions thereof. Further, while these programs are illustrated together in this example, during use, some or all of these programs may be executed on separate vehicle computing device(s) 104. Alternatively, in some examples, each of these programs 130, 224, 228 may be part of a single program. For instance, in some cases, the vehicle control program 228 may also be an AI application 130 that employs one or more AI algorithms 128 for determining at least one value.

In addition, the computer-readable media 218 may store data, data structures, machine-learning models and other AI algorithms 128, and other information used for performing the functions and services described herein. For example, the computer-readable media 218 may store the AI algo-rithm(s) 128, which may be one or more machine-learning models. Examples of AI algorithms 128 that may be used in some examples herein may include artificial neural net-works, such as self-organizing neural networks, recurrent neural networks, convolutional neural networks, modular neural networks, deep learning neural networks, and so forth, as well as predictive models, decision trees, classifiers, regression models, such as linear regression models, support vector machines, stochastic models, such as Markov models and hidden Markov models, and the like. Implementations herein are not limited to any particular type of AI algorithm.

Additionally, the computer-readable media 218 may store sensor data 226 received from the onboard sensors 112, and that may be used by the AI application(s) 130 to determine the AI application output data 126, which in turn may be used by the vehicle control program 228 for controlling one or more vehicle systems 114, subsystems, components, or the like. Further, while the data, data structures and AI algorithm(s) 128 are illustrated together in this example, during use, some or all of these elements may be stored by separate ones of the vehicle computing device(s) 104. The vehicle computing device(s) 104 may also include or main-tain other functional components and data, which may include programs, drivers, etc., and the data used or gener-ated by the functional components. Further, the computing device(s) 104 may include many other logical, program-matic, and physical components, of which those described above are merely examples that are related to the discussion herein.

The one or more communication interfaces 220 may include one or more software and hardware components for enabling communication with various other devices, such as over the CAN bus and/or over the one or more network(s) 106. For example, the communication interface(s) 220 may enable communication through one or more of a LAN, the Internet, cable networks, cellular networks, wireless net-works (e.g., Wi-Fi) and wired networks (e.g., CAN, Fibre Channel, fiber optic, Ethernet), direct connections, as well as close-range radio communications such as BLUETOOTH®, and the like, as additionally listed elsewhere herein.

The sensor data 226 may include sensor data received from the onboard sensors 112. For example, the onboard sensors 112 may include any of a plurality of different types of sensors such as a camera system, radar, LIDAR, ultra-sound, a satellite positioning system receiver, such as a global navigation satellite system (GNSS) receiver (referred to hereinafter by the common usage name "GPS", which is also intended to be inclusive of any other satellite position-ing system), accelerometers, a compass, and the like. In addition, the sensor data 226 used by the vehicle control program 228 may include information received from or associated with various vehicle systems 114, such as from a suspension controller associated with a suspension system, a steering controller associated with a steering system, a vehicle speed controller associated with a braking and acceleration system (not shown in FIG. 1), and so forth.

For example, the vehicle control program 228 may use rule-based and or artificial-intelligence-based control algo-rithms (including one or more of the AI algorithm(s) 128) to determine parameters for vehicle control, such as based on the output of the AI application(s) 130 (e.g., in the case of a recognition output). For instance, the vehicle control program 228 may determine an appropriate action, such as braking, steering, accelerating, or the like, and may send one or more control signals to one or more vehicle systems 114 based on the determined action. For example, the vehicle control program 228 may send control signals to the sus-pension controller, the steering controller, and/or the vehicle speed controller for controlling or partially controlling the vehicle in some applications.

The service computing device(s) 108 may include one or more servers or other types of computing devices that may be embodied in any number of ways. For instance, in the case of a server, the programs, other functional components, and data may be implemented on a single server, a cluster of servers, a server farm or data center, a cloud-hosted computing service, and so forth, although other computer architectures may additionally or alternatively be used.

Further, while the figures illustrate the functional components and data of the service computing device 108 as being present in a single location, these components and data may alternatively be distributed across different computing devices and different locations in any manner. Consequently, the functions may be implemented by one or more service computing devices 108, with the various functionality described herein distributed in various ways across the different computing devices. Multiple service computing devices 108 may be located together or separately, and organized, for example, as virtual servers, server banks, and/or server farms. The described functionality may be provided by the servers of a single entity or enterprise, or may be provided by the servers and/or services of multiple different entities or enterprises.

In the illustrated example, each service computing device 108 may include one or more processors 240, one or more computer-readable media 242, and one or more communication interfaces 244. Each processor 240 may be a single processing unit or a number of processing units, and may include single or multiple computing units or multiple processing cores. The processor(s) 240 can be implemented as one or more microprocessors, microcomputers, microcontrollers, digital signal processors, central processing units, system-on-chip processors, state machines, logic circuitries, and/or any devices that manipulate signals based on operational instructions. For instance, the processor(s) 240 may be one or more hardware processors and/or logic circuits of any suitable type specifically programmed or configured to execute the algorithms and processes described herein. The processor(s) 240 can be configured to fetch and execute computer-readable instructions stored in the computer-readable media 242, which can program the processor(s) 240 to perform the functions described herein.

The computer-readable media 242 may include volatile and nonvolatile memory and/or removable and non-removable media implemented in any type of technology for storage of information, such as computer-readable instructions, data structures, program modules, or other data. Such computer-readable media 242 may include, but is not limited to, RAM, ROM, EEPROM, flash memory or other memory technology, optical storage, solid state storage, magnetic tape, magnetic disk storage, storage arrays, network attached storage, storage area networks, cloud storage, or any other medium that can be used to store the desired information and that can be accessed by a computing device. Depending on the configuration of the service computing device 108, the computer-readable media 242 may be a type of computer-readable storage media and/or may be a tangible non-transitory media to the extent that when mentioned herein, non-transitory computer-readable media exclude media such as energy, carrier signals, electromagnetic waves, and signals per se.

The computer-readable media 242 may be used to store any number of functional components that are executable by the processors 240. In many implementations, these functional components comprise instructions or programs that are executable by the processors 240 and that, when executed, specifically configure the one or more processors 240 to perform the actions attributed above to the service computing device 108. Functional components stored in the computer-readable media 242 may include a server AI diagnostic program 246 that may be executed to detect indicators of AI algorithm anomalies based on receipt and analysis of vehicle ID, vehicle location, and AI application output data 126, and to provide an instruction for a diagnostic level 136 based on the analysis.

In addition, the computer-readable media 242 may store data used for performing the operations described herein. Thus, the computer-readable media 242 may include the sensor configuration database 120 and the historical AI application output database 122, as discussed above. In addition, the computer-readable media 242 may store, at least temporarily, the AI application output data 126. Additionally, in the case that an anomaly is not detected, the server AI diagnostic program 246 may add the received AI application output data 126 to the historical AI application output database 122 for the corresponding road segment (or other location data) and sensor configuration. However, if an anomaly is detected, then the received AI application output data 126 is not added to the historical AI application output database 122.

Further, the service computing device 108 may also include or maintain other functional components and data not specifically shown in FIG. 2, which may include programs, drivers, etc., and the data used or generated by the functional components. Additionally, the service computing device 108 may include many other logical, programmatic, and physical components, of which those described above are merely examples that are related to the discussion herein.

The communication interface(s) 244 may include one or more interfaces and hardware components for enabling communication with various other devices, such as over the network(s) 106. For example, communication interface(s) 244 may enable communication through one or more of the Internet, cable networks, cellular networks, wireless networks (e.g., Wi-Fi) and wired networks (e.g., fiber optic and Ethernet), as well as close-range radio communications, such as BLUETOOTH®, BLUETOOTH® low energy, and the like, as additionally enumerated elsewhere herein.

Figure 3:
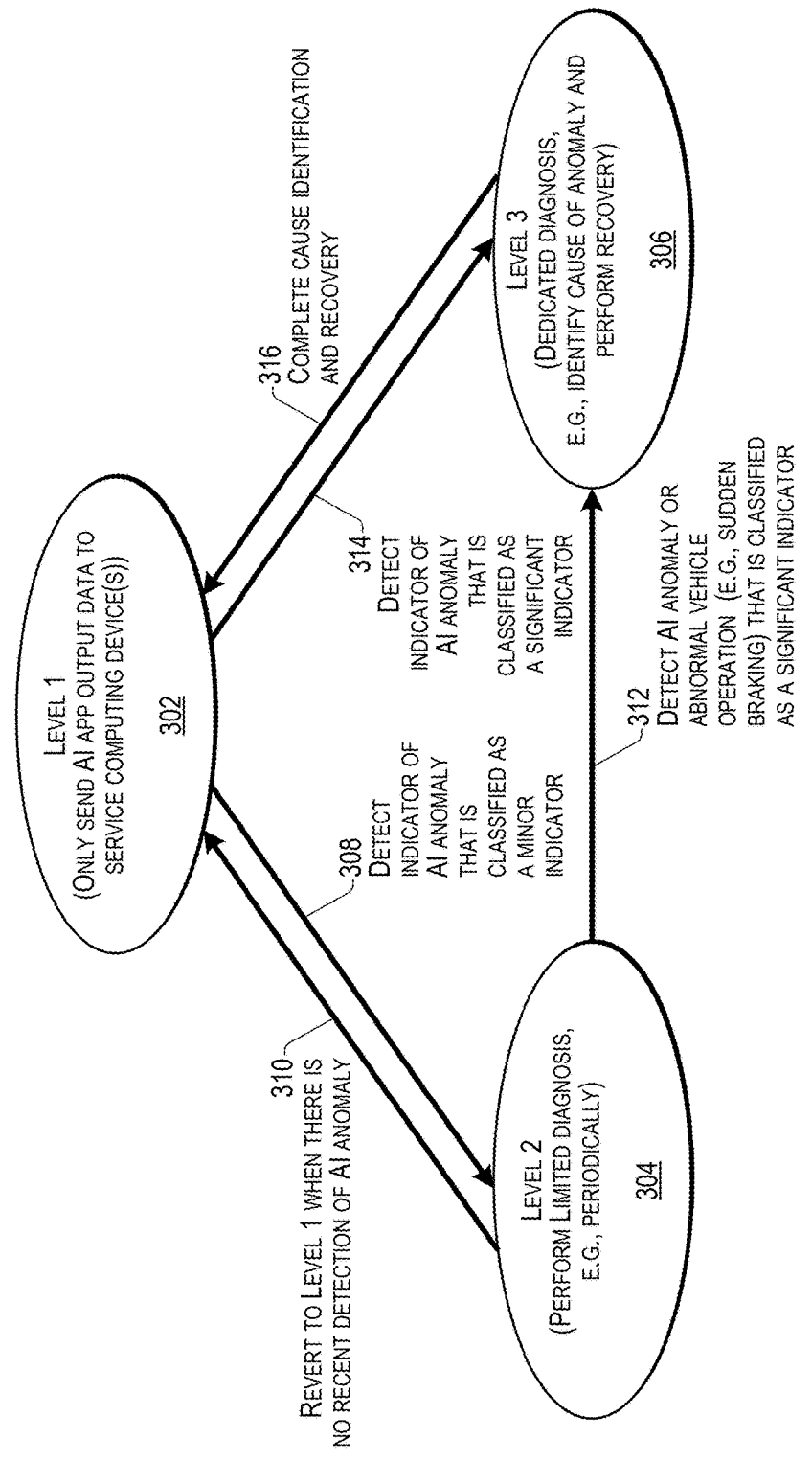
FIG. 3 illustrates an example of diagnosis levels according to some implementations.

FIG. 3 illustrates an example 300 of diagnosis levels according to some implementations. In the example of FIG. 3, level 1 as indicated at 302, corresponds to only sending the AI application output data to the service computing devices 108; level 2, as indicated at 304, further includes performing limited diagnosis on the AI algorithm (e.g., periodically) in addition to sending the AI application output data periodically to the service computing devices 108; and level 3, as indicated at 306 includes performing dedicated diagnosis of the AI algorithm such as by identifying cause of the anomaly and performing recovery.

Additionally, as indicated at 308, when an indicator of an AI anomaly is detected that is classified as a minor indicator, the vehicle computing device(s) 104 is instructed to operate at level 2, i.e., for performing periodic limited diagnosis on the AI algorithm. Additionally, as indicated at 310, when there is no recent detection of an AI anomaly, the vehicle computing device(s) 104 may be instructed to revert back to level 1 and may no longer perform any periodic diagnosis of the AI algorithm. Alternatively, as indicated at 312, if the vehicle computing device(s) 104 are currently operating at level 2 and detect an indicator of an AI anomaly or abnormal vehicle operation such as sudden breaking, sudden lane changes, or the like, that is classified as a significant indicator of an AI anomaly, the vehicle computing device(s) 104 may escalate the level of diagnosis to level 3 for performing a dedicated diagnosis of the corresponding AI algorithm, such as to identify a cause of the anomaly and to perform recovery.

Alternatively, as indicated at 314, when the service computing device(s) 108 detect an indicator of an AI anomaly that is classified as a significant indicator, the service computing device(s) 108 (i.e., the server AI diagnostic program 246) may instruct the vehicle computing device(s) 104 to escalate the diagnosis level on the vehicle computing device(s) 104 to level 3 for initiating a dedicated diagnosis of the AI algorithm to identify a cause of the AI anomaly and to perform recovery of normal operation of the AI algorithm. Furthermore, as indicated at 316, when the cause identification and recovery has been completed, the vehicle computing device(s) 104 may revert to level 1 for periodically sending the AI application output data 126 to the service computing device(s) 108.

Figure 4:
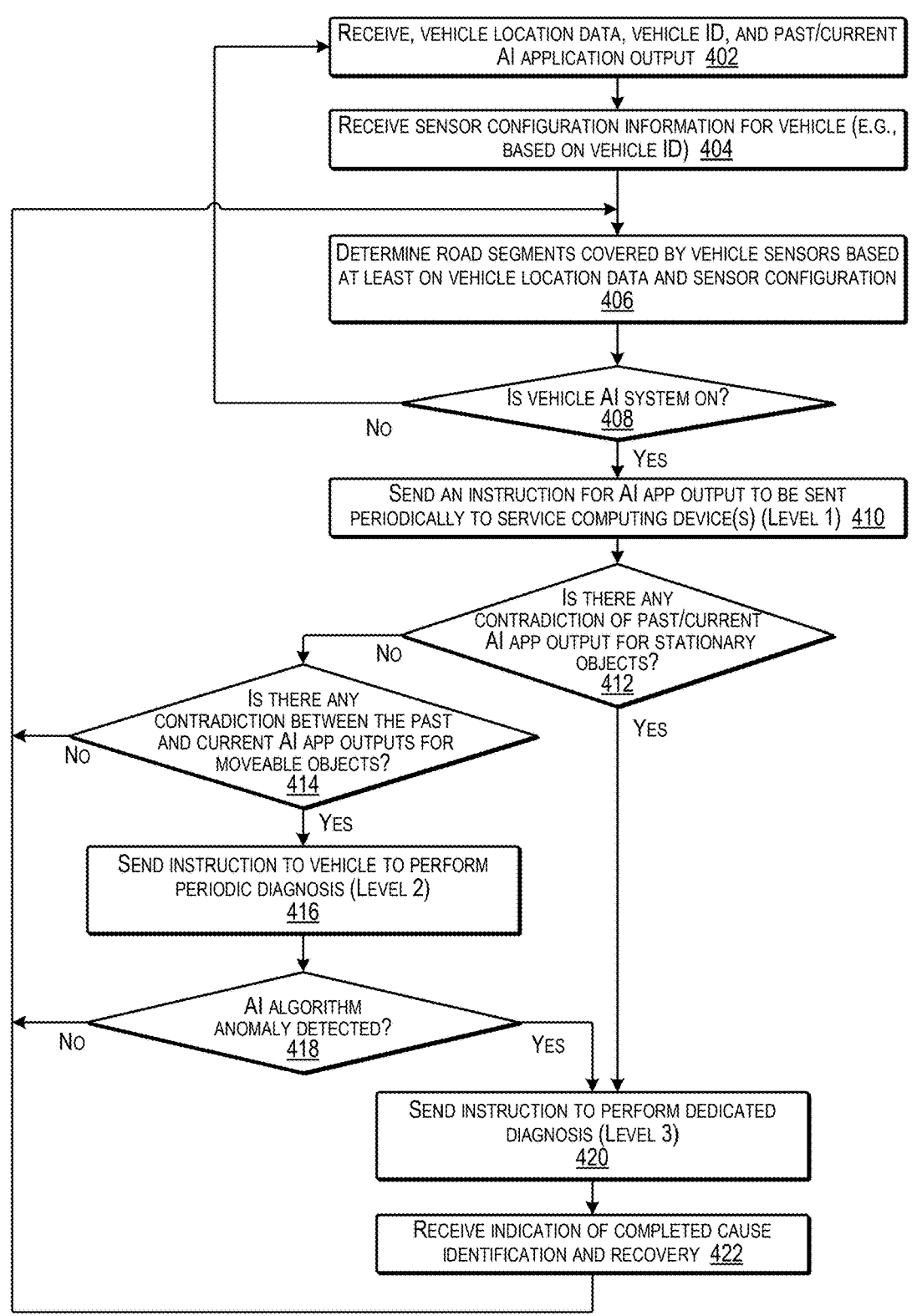
FIG. 4 is a flow diagram illustrating an example process for performing diagnostics on an AI algorithm according to some implementations.

FIG. 4 is a flow diagram illustrating an example process 400 for performing diagnostics on an AI algorithm according to some implementations. The processes described herein are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need to be executed. For discussion purposes, the processes are described with reference to the environments, systems, and devices described in the examples herein, although the processes may be implemented in a wide variety of other environments, systems, and devices.

In some examples, the process 400 may be executed by the system 100 discussed above. For instance, in the illustrated example, the process 400 may be executed by the service computing device(s) 108, such as by execution of the server AI diagnostic program 246. Alternatively, if the vehicle computing device(s) 104 has access to sufficient database information and sufficient processing capabilities, in some cases, the vehicle computing device(s) 104 may perform some or all of the process 400.

In the example process 400 of FIG. 4, one or more indicators of anomalies in an AI algorithm may be detected based on the output of an AI application. The process 400 illustrates server-side processing for detecting indicators of an AI anomaly for a single AI algorithm, which may be for a single sensor in some examples, or for a plurality of sensors in other examples. As discussed above, initially, the road segments covered by the sensor(s) are identified. In addition to historical AI output information, the historical AI application output DB 122 may include information on the names and locations of stationary objects, such as landmarks, traffic lights, stop signs, buildings, geographical features, telephone poles, trees, and so forth. In some cases, the process of detecting AI anomalies may be divided into detecting moving objects and stationary objects. For example, for moving objects such as a person or vehicle, when the current AI application output includes a person with a high confidence score, and the actual presence of a person is unlikely based on historical data, this may be classified a minor indicator of an AI anomaly, and a periodic diagnosis (level 2) may executed. Thus, in some examples, contradictions detected for movable objects may be classified as minor indications of an AI anomaly.

Additionally, for stationary objects such as traffic lights, when the current AI application output does not include a traffic light that should have been detected, and there are no obstacles, this may be classified as an indicator of a significant AI anomaly, and a dedicated diagnosis (level 3) may be executed. The stationary object information (object name (e.g., traffic light), longitude, latitude, height) that is stored in the historical AI application output database 122 also may be used for detecting significant indicators of an AI anomaly, for example, based on the difference between the actual height of an object and the height estimated by the AI application. Furthermore, if there is a failure to detect the expected number of landmarks or other stationary objects at the current GPS location, and taking into consideration the sensor configuration when there are no obstructions, this may also be classified as a significant indicator of an AI anomaly, and a dedicated diagnosis (level 3) may be performed. Thus, in some examples, contradictions for stationary objects as well as unexpected vehicle behavior may be classified as significant indicators of an AI anomaly.

At 402, the service computing device may receive, from the vehicle computing device(s), vehicle location data, vehicle ID, and past and current AI application outputs to use for performing diagnosis to monitor for any indications of AI algorithm anomalies. As mentioned above, e.g., with respect to FIG. 1, the past AI application outputs may be obtained by accessing the historical AI application output DB 122.

At 404, the service computing device may receive the sensor configuration information for the vehicle. For example, based on the vehicle ID received at 402, the service computing device may access the sensor configuration database 120 to obtain the sensor configuration for the particular vehicle. As one example, the sensor configuration may have been previously provided to the service computing device by the vehicle computing device 104, such as when registering for the AI anomaly monitoring service provided by the service computing device. As another example, the sensor configuration may be a standard sensor rate configuration for the make and model of the vehicle corresponding to the vehicle ID received at 402. Other variations will be apparent to those of skill in the art having the benefit of the disclosure herein.

At 406, the service computing device may determine road segments covered by vehicle sensors based at least on the vehicle location data and the sensitive configuration data for the vehicle. Additionally, or alternatively, such as in the examples herein that are directed to other types of mobile apparatuses other than ground vehicles, rather than determining road segments, the AI application outputs may be stored in association with corresponding location information, such as longitude and latitude coordinates (and altitude/depth in some cases) that may be determined based on the received location data.

At 408, the service computing device may determine whether the vehicle AI system to be monitored is currently operating. If so, the process proceeds to 410. If not, the process goes back to 402 to wait for a next receipt of vehicle information. As one example the service computing device may send a communication to the vehicle computing device to determine whether the AI system is currently in operation.

At 410, based at least on determining that the vehicle AI system is operating, the service computing device may send an instruction for the vehicle computing device to periodically send the AI application output to the service computing device, i.e., according to level 1 diagnosis discussed above with respect to FIGS. 1-3.

At 412, the service computing device may determine whether there is any contradiction between the past AI model outputs and the current AI application output for stationary objects at the currently considered road segment (or the currently determined location in other examples). If so, this may be classified as a significant indicator of an AI anomaly, and the process goes to 420. If not, the process goes to 414.

At 414, the service computing device may determine whether there are any contradictions between the past and current AI app outputs for moveable objects associated with the currently considered road segment (or other currently determined location). If so, this may be classified as a minor indicator of an AI algorithm anomaly, and the process goes to 416. If not, the process returns to 406 to select a next road segment (or next location) for consideration of the corresponding past and current AI app outputs.

At 416, based at least on determining the minor indicator of an AI algorithm anomaly, the service computing device may send an instruction to the vehicle computing device to instruct the vehicle computing device to perform periodic diagnosis (Level 2).

At 418, the service computing device may determine whether an AI algorithm anomaly is detected by the level 2 periodic diagnosis. If so, the process goes to 420. If not, after a threshold number of iterations, the process may return to 406.

At 420, based on the detection of an AI algorithm anomaly from the level 2 periodic diagnostics at 418, or alternatively, based on the determination that there is a contradiction between past and current AI app outputs for stationary objects as determined at 412, the service computing device may send an instruction to the vehicle computing device to perform dedicated diagnosis according to level 3. In some examples, sending the instruction may include at least one of sending a notification to a vehicle occupant to notify the vehicle occupant of the AI algorithm anomaly and to recommend immediate service for the vehicle; sending a notification to a device associated with maintenance for the vehicle; changing an operating speed of the vehicle or pulling the vehicle over to the side of the road to execute processing to identify a cause of the AI anomaly and perform recovery; or instructing the vehicle to navigate to a maintenance location to identify a cause of the anomaly and perform recovery.

At 422, the service computing device may receive an indication of completed level III diagnosis including cause identification and/or recovery of the AI algorithm. For example, in response to receiving the instruction from the service computing device at 420, the vehicle computing device may perform the level 3 diagnosis on the AI algorithm such as to determine a cause of the anomaly and/or to perform a recovery such as by rebooting the computing device that executes the AI algorithm or the like. In some examples, if the vehicle is currently operating on a road, the vehicle control program 228 may cause the vehicle to slow down, pullover, drive to a maintenance facility, or the like, as discussed above, to perform the cause identification diagnosis and recovery. When the level 3 operation is complete, the vehicle computing device may begin sending the periodic AI application outputs and current vehicle location data to the service computing device to enable the service computing device to continue monitoring of the AI system on the vehicle. Numerous other variations will be apparent to those of skill in the art having the benefit of the disclosure herein.

Figure 5:
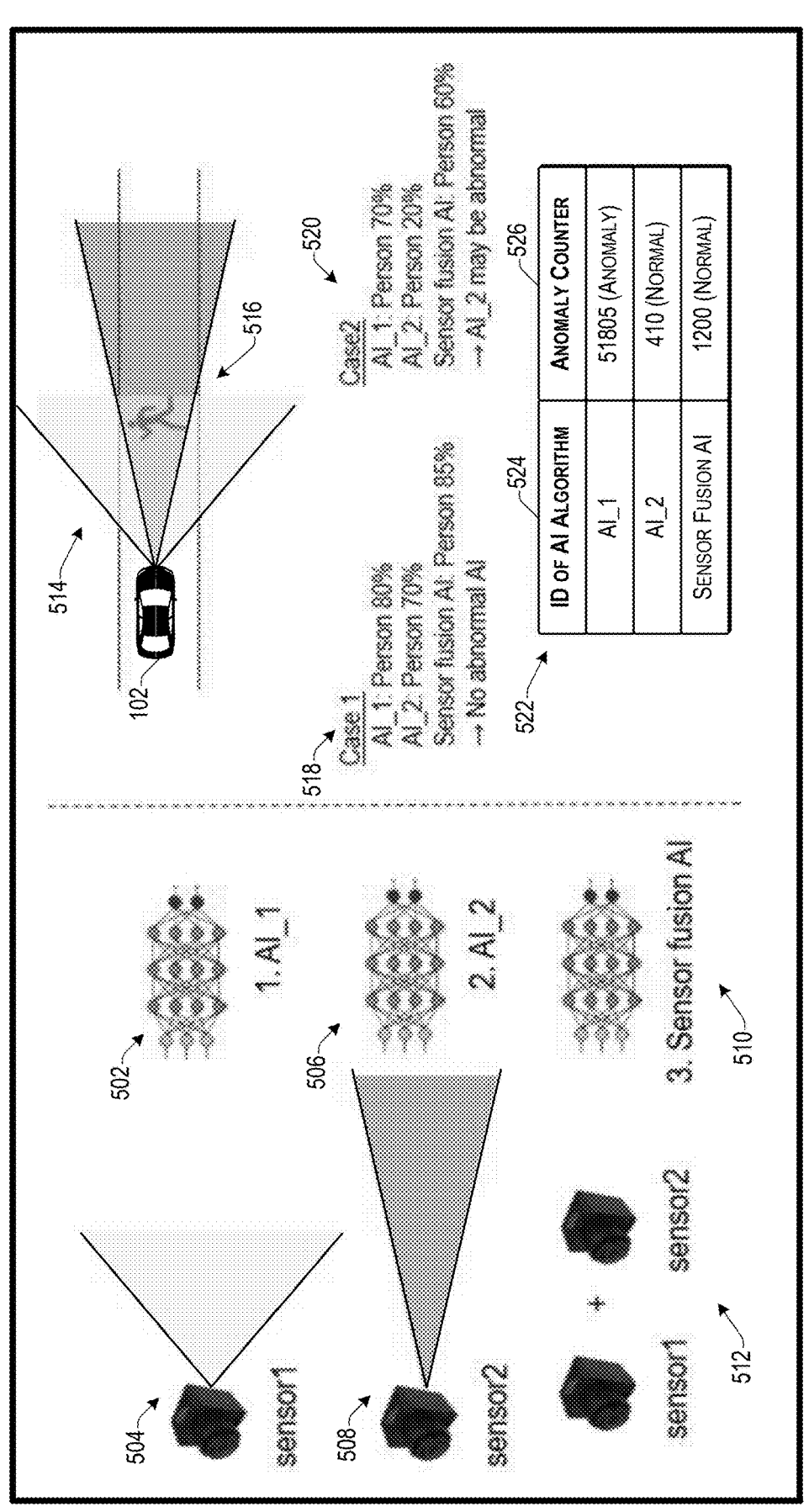
FIG. 5 illustrates an example of identifying an AI algorithm likely to have an AI anomaly from among a plurality of AI algorithms according to some implementations.

FIG. 5 illustrates an example 500 of identifying an AI algorithm likely to have an AI anomaly from among a plurality of AI algorithms according to some implementations. In this example, suppose that there are three AI algorithms, namely a first AI algorithm 502 that receives sensor data from a first sensor 504 ("sensor1"); a second AI algorithm 506 that receives sensor data from a second sensor 508 ("sensor2"); and third AI algorithm 510 that performs sensor fusion for the results of sensor1 504 and sensor2 508, as indicated at 512.

Furthermore, in this example, the sensor detection area of sensor1 504 and sensor2 508 overlap, as indicated at 514. For example, sensor1 504 may have a wide-angle field of view while sensor2 508 may have a narrower longer-range field of view. Because the sensor detection areas (i.e., fields of view) overlap, as illustrated at 514, both the first AI algorithm 502 and the second AI algorithm 506 may detect the same object within the fields of view of their respective sensors, such as a person 516.

Additionally, for identifying a malfunctioning AI algorithm from among the multiple AI algorithms 502, 506, and 510, the examples herein may consider both short-term and long-term perspectives. From a short-term perspective, when all three AI algorithms exhibit high confidence scores and the identified object names are identical (e.g., "person"), the service computing device (not shown in FIG. 1) may determine that there are no indicators of an AI anomaly. In particular, as illustrated at 518 for a first case, suppose that the first AI algorithm 502 identifies a person with 80 percent confidence, the second AI algorithm 506 identifies a person with 70 percent confidence, and the third AI algorithm 510 identifies a person with 85 percent confidence. Accordingly, the result of these AI algorithm outputs indicates that there are no AI anomalies detected among the multiple AI algorithms 502, 506, and 510.

On the other hand, as illustrated at 520 for a second case, suppose that the second AI algorithm 506 exhibits a relatively low confidence score (e.g., 20 percent) for identifying a person (or a different object name), while the first AI algorithm 502 identifies a person with 70 percent confidence, and the sensor fusion third AI algorithm 510 identifies a person with 60 percent confidence. In this example, the service computing device may determine that the AI algorithm output results include an indicator of an AI anomaly. Furthermore, from the short-term perspective, it may appear that the second AI algorithm 506 is the algorithm that includes an AI anomaly.

To keep track of AI anomalies over a long-term perspective, a data structure 522 may be maintained that includes an ID 524 of each AI algorithm and an anomaly counter 526 for each listed AI algorithm. Accordingly, from the long-term perspective, when the output of an AI algorithm is inconsistent with the outputs of other AI algorithms, the anomaly counter value at 526 may be incremented for that AI algorithm. Subsequently, when the value in the anomaly counter 526 satisfies a threshold value, the corresponding AI algorithm may be flagged as having an indicator of an AI. Based on the indicators of such AI anomalies for the respective AI algorithm, the diagnostic computing load can be suppressed by increasing the diagnostic level only for that AI algorithm whose anomaly counter has reached the threshold limit. Consequently, in the example of case two, the anomaly counter 526 for the second AI algorithm 506 may be incremented from "410" to "411" but the anomaly counter for the second AI algorithm 506 is still within still below the threshold for an anomaly indicator, whereas the anomaly counter 526 for the first AI algorithm 502 has already exceeded the threshold, and may be subject to, for example, level 2 periodic diagnosis.

Figure 6:
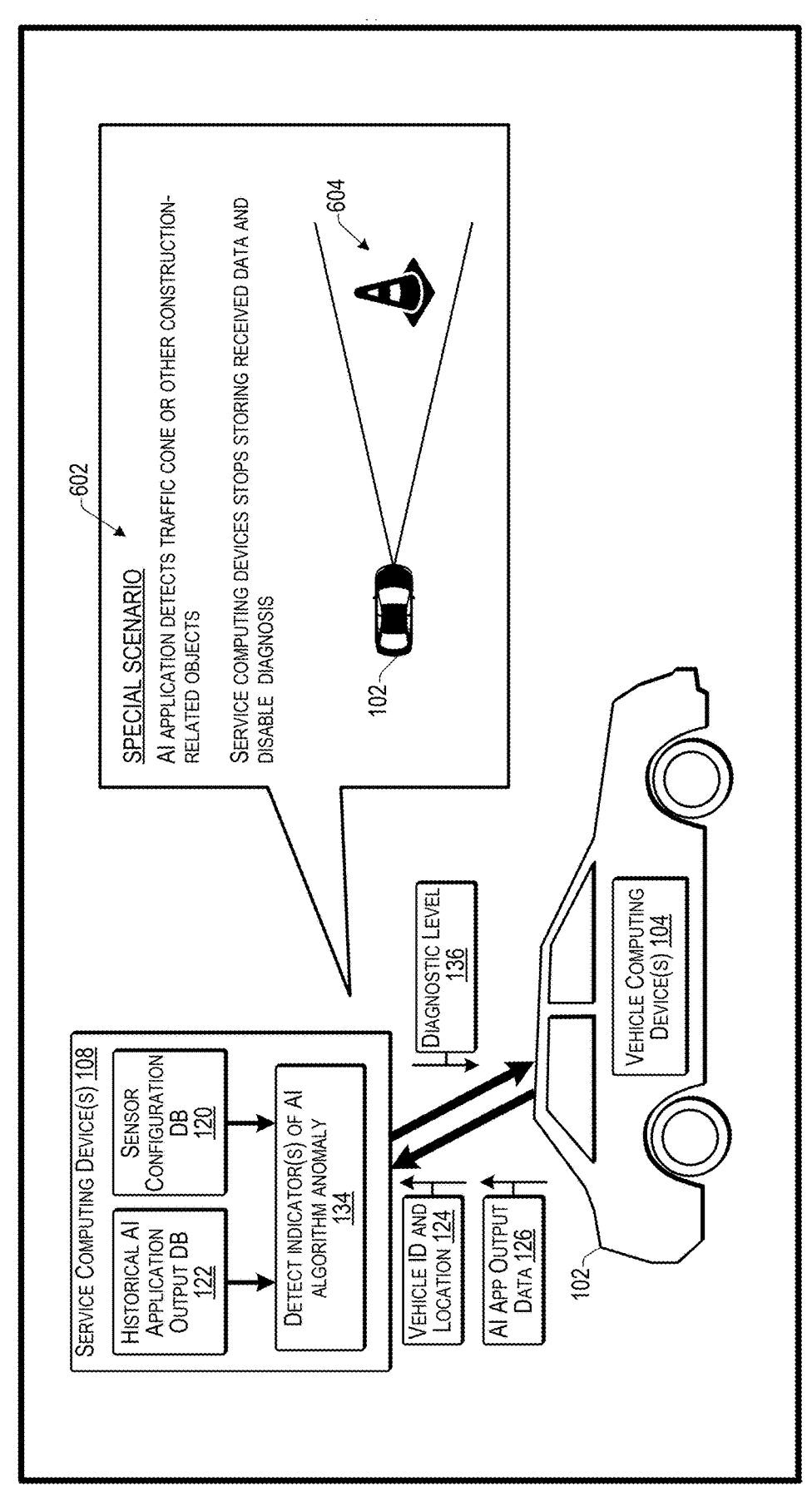
FIG. 6 illustrates an example of reducing the number of false positives for detecting AI anomalies according to some implementations.

FIG. 6 illustrates an example 600 of reducing the number of false positives for detecting AI anomalies according to some implementations. As one example, to reduce the number of false positives of detected indicators of AI anomalies, the diagnostic level is not changed in that case of some exceptions that may occur in special scenarios. For example, as indicated at 602, when the vehicle 102 enters an area that is under construction, this may likely lead to a false indicator of AI anomalies because the current AI algorithm output will often differ from the past AI output due to the ongoing construction.

In the illustrated example, suppose that the vehicle 102 detects one or more traffic cones 604 while traversing a particular road segment, which is indicative of a construction zone. Accordingly, in this situation the service computing device may determine that the vehicle has entered a construction zone and may stop storing the AI application output data that is received from the vehicle 102. For instance, such special scenarios may be treated as exceptions, and the diagnostic level for the corresponding AI is not changed even though there may be significant differences between the current recognition results and the recognition results stored in the historical AI application output database 122 for the same road segment. Examples when such exceptions are triggered may include when the AI application output results include recognition of one or more traffic cones, construction barricades, construction equipment, or the like, which may be indicative of a construction zone, as well as various other special scenarios such as detection of the presence of an ambulance, fire truck, police vehicle, or the like. Numerous other variations will be apparent to those of skill in the art having the benefit of the disclosure herein.

Figure 7:
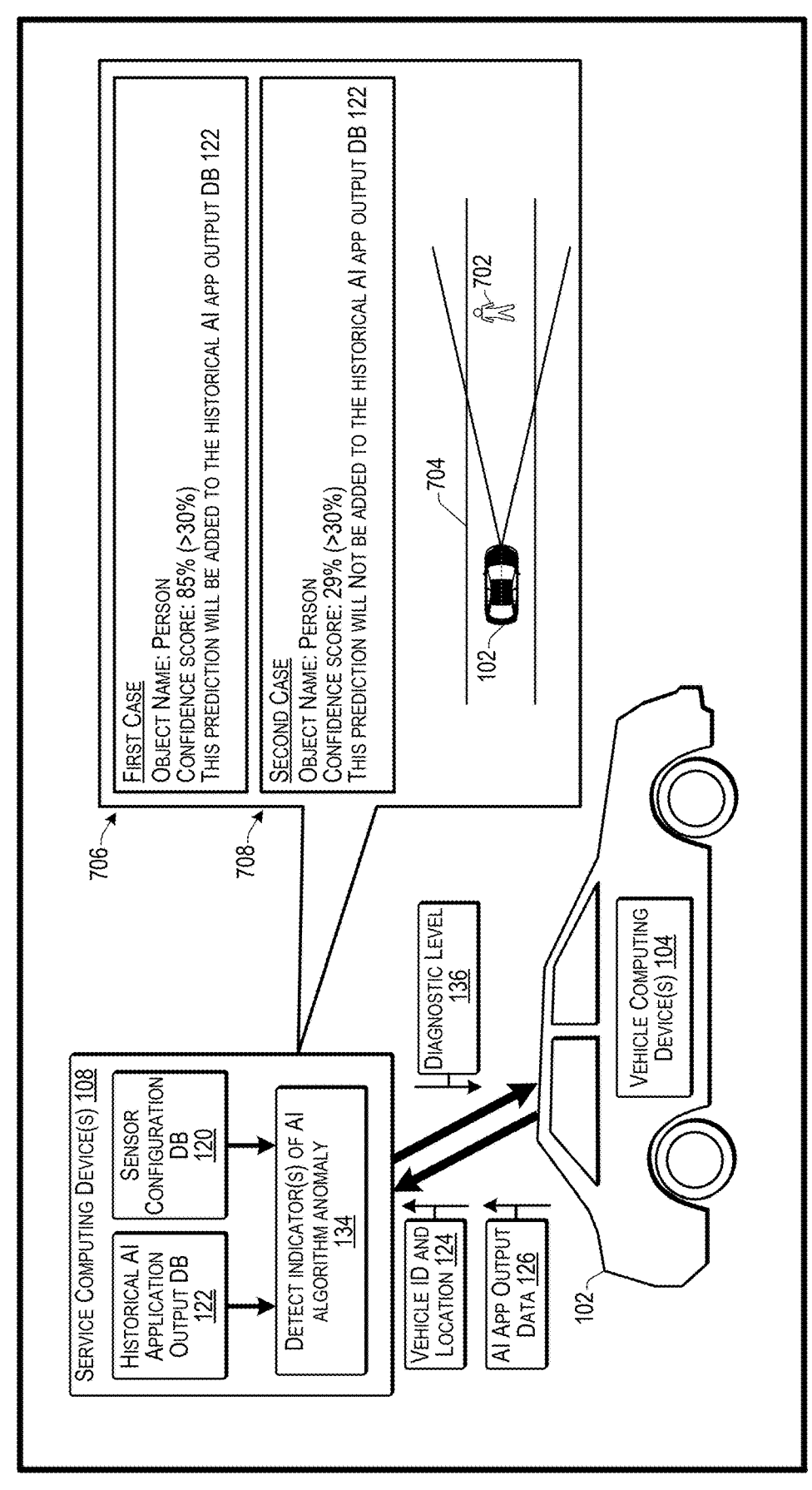
FIG. 7 illustrates an example of determining whether to add the AI application output data to the historical AI application output database according to some implementations.

FIG. 7 illustrates an example 700 of determining whether to add the AI application output data 126 to the historical AI application output database 122 according to some implementations. In this example, the historical AI application output DB 122 is populated based on comparison with a confidence score threshold. In adding new data to the historical AI application output DB 122, the AI application output data 126 received from each vehicle 102 may be stored for each road segment traversed by each vehicle 102 that uses the AI algorithm monitoring service provided by the service computing devices 108.

In general, when the confidence score of AI algorithm output is relatively small, the output is substantially more likely to be incorrect. Accordingly, in some examples herein, a threshold for a minimum confidence score is established, and only the AI output data having a confidence score that exceeds the confidence score threshold will be stored in the historical AI application output DB 122. By implementing the confidence score threshold, the accuracy of detecting indicators of AI anomalies is improved and the number of false positives is reduced.

In the example of FIG. 7, suppose that the vehicle 102 may be able to recognize a person 702 in a roadway 704. As illustrated at 706, in a first case suppose that a recognized object name is a person, and that the confidence score provided by the AI algorithm is 85 percent. Furthermore, suppose that the threshold for adding data to the historical AI application output database 122 is 30 percent. Accordingly, in the first case 706, the AI application output data 126 will be added to the historical AI application output database 122 for the current road segment (or location) of the vehicle 102. On the other hand, as illustrated at 708, in a second case, suppose that the AI application output object name is a person, and that the confidence score of the AI algorithm is 29 percent. Because the confidence score of 29 percent is less than the threshold of 30 percent, the AI application output data 126 will not be added to the historical AI application output database 122. Furthermore, while an example confidence threshold of 30 percent is used in this example, in other examples, the confidence score may be different, depending on the particular use scenarios, system configurations, and the like.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, the implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Various instructions, processes, and techniques described herein may be considered in the general context of computer-executable instructions, such as computer programs and applications stored on computer-readable media, and executed by the processor(s) herein. Generally, the terms program and application may be used interchangeably, and may include instructions, routines, modules, objects, components, data structures, executable code, etc., for performing particular tasks or implementing particular data types. These programs, applications, and the like, may be executed as native code or may be downloaded and executed, such as in a virtual machine or other just-in-time compilation execution environment. Typically, the functionality of the programs and applications may be combined or distributed as desired in various implementations. An implementation of these programs, applications, and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed:

1. A system comprising:

one or more processors configured by executable instructions to perform operations comprising:

receiving, from a vehicle, at least vehicle location data and artificial intelligence (AI) output data generated by an AI algorithm on the vehicle;

determining a road segment corresponding to the vehicle location data, the AI output data received from the vehicle including object recognition data indicating an object recognized by the AI algorithm on the vehicle at the road segment;

accessing, based at least on the road segment, past AI output data stored in a database and associated with the road segment, the past AI output data stored in the database including object recognition data indicating objects recognized at a plurality of road segments, including the road segment, by AI algorithms of a plurality of vehicles that previously traversed the plurality of road segments;

comparing the received AI output data including the object recognized by the AI algorithm on the vehicle with the past AI output data including the objects recognized and stored in the database for the plurality of vehicles that previously traversed the road segment;

based at least on comparing the received AI output data with the past AI output data associated with the road segment, determining an indication of an AI algorithm anomaly for the AI algorithm of the vehicle; and based at least on determining the indication of the AI algorithm anomaly, sending an instruction to the vehicle to cause the vehicle to perform at least one action including at least one of:

changing an operating speed of the vehicle; or navigating the vehicle to a maintenance location.

2. The system as recited in claim 1, the operations further comprising:

receiving, from the vehicle, a vehicle identifier; and based at least on the received vehicle identifier, determining a sensor configuration for the vehicle, wherein the comparing the received AI output data with the past AI output data for the road segment further comprises taking into consideration the sensor configuration for the vehicle during the comparing.

3. The system as recited in claim 1, wherein comparing the received AI output data with the past AI output data comprises detecting at least one difference between movable objects identified in the received AI output data and movable objects identified in the past AI output data.

4. The system as recited in claim 3, wherein, based at least on detecting the at least one difference, the instruction sent to the vehicle includes an instruction for the vehicle to perform periodic diagnosis of the AI algorithm corresponding to the AI output data to check for the AI algorithm anomaly.

5. The system as recited in claim 1, wherein comparing the received AI output data with the past AI output data comprises detecting at least one difference between stationary objects identified in the received AI output data and stationary objects identified in the past AI output data.

6. The system as recited in claim 5, wherein, based at least on detecting the at least one difference, the instruction sent to the vehicle includes an instruction for the vehicle to perform at least one of a cause identification or recovery process for the AI algorithm corresponding to the AI output data to check for the AI algorithm anomaly.

7. The system as recited in claim 1, wherein:

comparing subsequently received AI output data with the past AI output data comprises failing to identify another indicator of an AI algorithm anomaly; and based at least on failing to identify another indicator of an AI algorithm anomaly, another instruction sent to the vehicle includes an instruction for the vehicle to periodically send additional AI output data to continue to monitor for an AI algorithm anomaly.

8. The system as recited in claim 7, the operations further comprising:

comparing a confidence score associated with the subsequently received AI output data with a confidence score threshold; and based at least on the confidence score associated with the subsequently received AI output data satisfying the confidence score threshold, storing the subsequently received AI output data in the database in association with the road segment.

9. A method comprising:

receiving, by one or more processors, from a mobile apparatus, at least mobile apparatus location data and artificial intelligence (AI) output data generated by an AI algorithm on the mobile apparatus;

determining a location corresponding to the mobile apparatus location data, the AI output data received from the mobile apparatus including object recognition data indicating an object recognized by the AI algorithm on the mobile apparatus at the location;

accessing, based at least on the location, past AI output data stored in a database and associated with the location, the past AI output data stored in the database including object recognition data indicating objects recognized at a plurality of locations, including the location, by AI algorithms of a plurality of mobile apparatuses that previously traversed the plurality of locations;

comparing the received AI output data including the object recognized by the AI algorithm on the mobile apparatus with the past AI output data including the objects recognized and stored in the database for the plurality of mobile apparatuses that previously traversed the location;

based at least on comparing the received AI output data with the past AI output data associated with the location, determining an indication of an AI algorithm anomaly for the AI algorithm of the mobile apparatus; and based at least on determining the indication of the AI algorithm anomaly, sending an instruction to the mobile apparatus to cause the mobile apparatus to perform at least one action including at least one of:

changing an operating speed of the mobile apparatus; or navigating the mobile apparatus to a maintenance location.

10. The method as recited in claim 9, further comprising:

receiving, from the mobile apparatus, a mobile apparatus identifier; and based at least on the received mobile apparatus identifier, determining a sensor configuration for the mobile apparatus, wherein the comparing the received AI output data with the past AI output data for the location further comprises taking into consideration the sensor configuration for the mobile apparatus during the comparing.

11. The method as recited in claim 9, wherein comparing the received AI output data with the past AI output data comprises detecting at least one difference between movable objects identified in the received AI output data and movable objects identified in the past AI output data.

12. The method as recited in claim 11, wherein, based at least on detecting the at least one difference, the instruction sent to the mobile apparatus includes an instruction for the mobile apparatus to perform periodic diagnosis of the AI algorithm corresponding to the AI output data to check for the AI algorithm anomaly.

13. The method as recited in claim 9, wherein comparing the received AI output data with the past AI output data comprises detecting at least one difference between stationary objects identified in the received AI output data and stationary objects identified in the past AI output data.

14. The method as recited in claim 13, wherein, based at least on detecting the at least one difference, the instruction sent to the mobile apparatus includes an instruction for the mobile apparatus to perform at least one of a cause identification or recovery process for the AI algorithm corresponding to the AI output data to check for the AI algorithm anomaly.

15. The method as recited in claim 9, wherein:

comparing subsequently received AI output data with the past AI output data comprises failing to identify an indicator of another AI algorithm anomaly, and based at least on failing to identify another indicator of an AI algorithm anomaly, another instruction sent to the mobile apparatus includes an instruction for the mobile apparatus to periodically send additional AI output data to continue to monitor for an AI algorithm anomaly.

16. The method as recited in claim 15, further comprising:

comparing a confidence score associated with the subsequently received AI output data with a confidence score threshold; and based at least on the confidence score associated with the subsequently received AI output data satisfying the confidence score threshold, storing the subsequently received AI output data in the database in association with the location.

17. One or more non-transitory computer-readable media storing instructions executable by one or more processors to cause the one or more processors to perform operations comprising:

receiving, from a mobile apparatus, at least mobile apparatus location data and artificial intelligence (AI) output data generated by an AI algorithm on the mobile apparatus;

determining a location corresponding to the mobile apparatus location data, the AI output data received from the mobile apparatus including object recognition data indicating an object recognized by the AI algorithm on the mobile apparatus at the location;

accessing, based at least on the location, past AI output data stored in a database and associated with the location, the past AI output data stored in the database including object recognition data indicating objects recognized at a plurality of locations, including the location, by AI algorithms of a plurality of mobile apparatuses that previously traversed the plurality of locations;

comparing the received AI output data including the object recognized by the AI algorithm on the mobile apparatus with the past AI output data including the objects recognized and stored in the database for the plurality of mobile apparatuses that previously traversed the location; and based at least on comparing the received AI output data with the past AI output data associated with the location, determining an indication of an AI algorithm anomaly for the AI algorithm of the mobile apparatus; and based at least on determining the indication of the AI algorithm anomaly, sending an instruction to the mobile apparatus to cause the mobile apparatus to perform at least one action including at least one of:

changing an operating speed of the mobile apparatus; or navigating the mobile apparatus to a maintenance location.

18. The one or more non-transitory computer-readable media as recited in claim 17, the operations further comprising:

receiving, from the mobile apparatus, a mobile apparatus identifier; and based at least on the received mobile apparatus identifier, determining a sensor configuration for the mobile apparatus, wherein the comparing the received AI output data with the past AI output data for the location further comprises taking into consideration the sensor configuration for the mobile apparatus during the comparing.

19. The one or more non-transitory computer-readable media as recited in claim 17, wherein:

comparing the received AI output data with the past AI output data comprises detecting at least one difference between movable objects identified in the received AI output data and movable objects identified in the past AI output data; and based at least on detecting the at least one difference, the instruction sent to the mobile apparatus includes an instruction for the mobile apparatus to perform periodic diagnosis of the AI algorithm corresponding to the AI output data to check for the AI algorithm anomaly.

20. The one or more non-transitory computer-readable media as recited in claim 17, wherein:

comparing the received AI output data with the past AI output data comprises detecting at least one difference between stationary objects identified in the received AI output data and stationary objects identified in the past AI output data; and based at least on detecting the at least one difference, the instruction sent to the mobile apparatus includes an instruction for the mobile apparatus to perform at least one of a cause identification or recovery process for the AI algorithm corresponding to the AI output data to check for the AI algorithm anomaly.

* * * * *